Oct. 10, 1944.  S. ROSENZWEIG  2,359,941
CHOCK DEVICE
Filed March 31, 1942  2 Sheets-Sheet 1
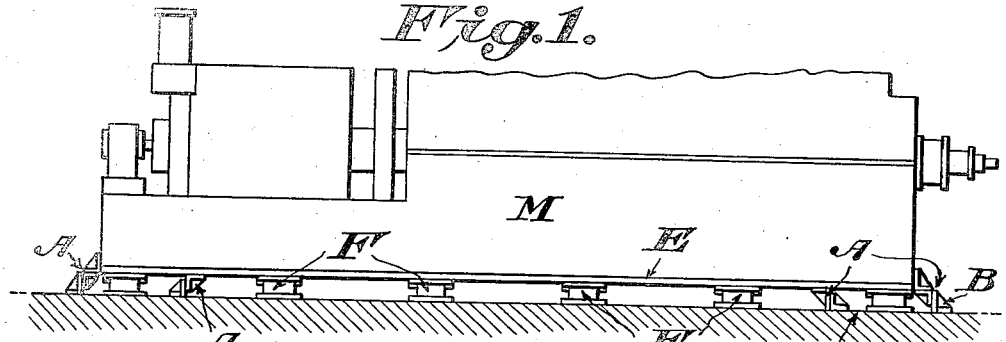
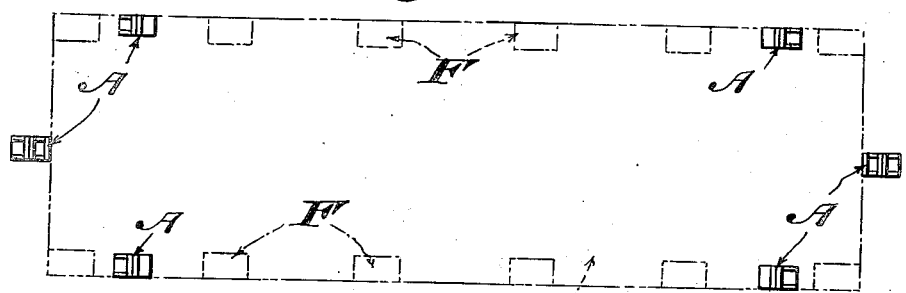
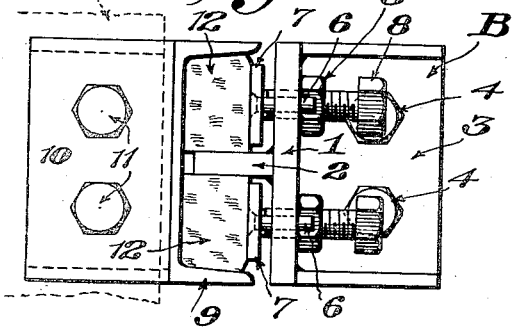
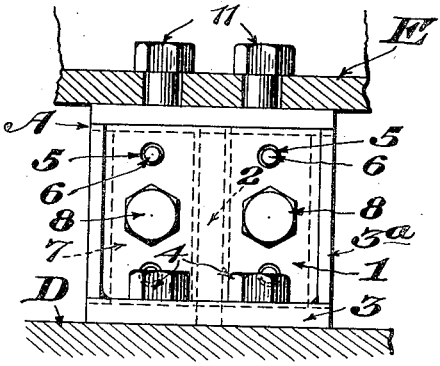
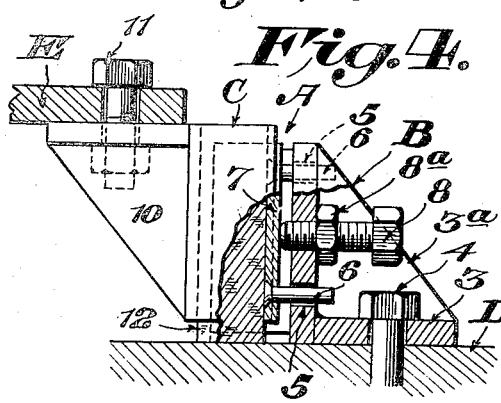
Inventor
S. Rosenzweig,
By Willhauter Groff
Attorneys Oct. 10, 1944.    S. ROSENZWEIG    2,359,941
CHOCK DEVICE
Filed March 31, 1942    2 Sheets-Sheet 2
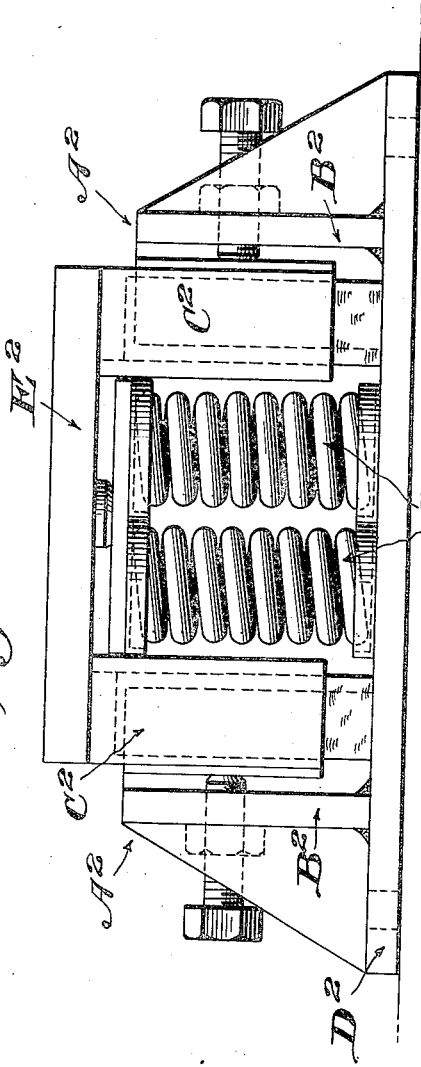
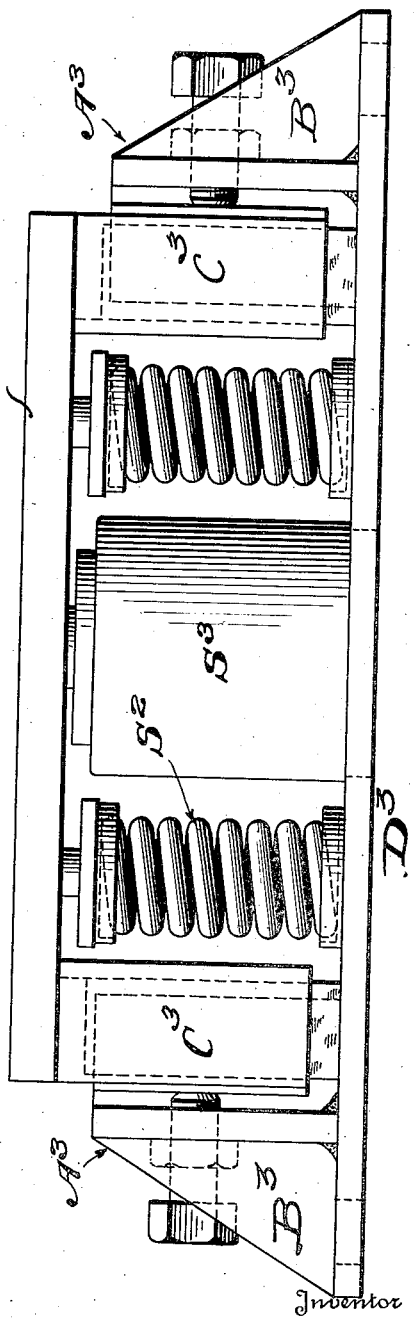
Inventor
S. Rosenzweig,
By Walhaughton & Groff
Attorneys Patented Oct. 10, 1944

2,359,941

UNITED STATES PATENT OFFICE 2,359,941

CHOCK DEVICE

Siegfried Rosenzweig, New York, N. Y.

Application March 31, 1942, Serial No. 437,054

7 Claims. (Cl. 248—21)

This invention relates to mountings for machinery and the like, more particularly, mountings of the type utilizing vibration isolators, and has special reference to simple and practical means for resisting horizontal or side-wise movement of the machinery base relative to the foundation.

Machinery units, or the like, mounted on vibration isolators intended to absorb vibrations transmitted either from the machine to the foundation, or vice versa, are often subjected to shock which manifests itself in horizontal direction. For example, the building or vessel in which the machine is mounted may be subjected to shock incident to the explosion of a bomb or mine, and the forces thus generated may not only manifest themselves in a direction perpendicular to the foundation, but also parallel thereto, that is, in a horizontal direction. Forces of this type may be of such magnitude as to displace or shift the machine or the like from its moorings. The same possibility is likely to occur in connection with machinery mounted on shipboard when the ship or vessel is caused to rock or roll by heavy seas.

Accordingly, the present invention has primarly in view, novel means for resisting and absorbing shocks transmitted to the machinery mounting in a direction substantially at right angles to a perpendicular or vertical plane with respect to the foundation. In that connection, the invention contemplates a novel chock device which may be applied directly to the machinery base and the foundation, or which may be combined with spring isolator units of the type designed to absorb vibrations generated by the operation of the machine or generated in the foundation by disturbances not due to the machine itself.

A further object of the invention is to provide a simple and practical form of chock device which may be readily applied to existing installations, or, as previously indicated, combined with the isolator itself where new installations permit of the use of a combined unit.

With the above and other objects in view, which will more readily appear as the nature of the invention is better understood, the same consists in the novel construction, combination, and arrangement of parts hereinafter more fully described, illustrated, and claimed.

A preferred and practical embodiment of the invention is shown in the accompanying drawings, wherein:

Fig. 1 is a side elevation of a machinery mounting showing the application of the present chock devices to a machine mounted on isolators.

Fig. 2 is a diagrammatic plan view of the machinery base, in dotted lines, further showing the manner of locating the chock devices.

Fig. 3 is a top plan view of one of the chock devices.

Fig. 4 is a side elevation partly in section, of the construction shown in Fig. 3.

Fig. 5 is an end elevation of the construction shown in Figs. 3 and 4.

Fig. 6 is a side elevation of a vibration isolator unit of the spring type embodying the features of the present chock device.

Fig. 7 is a side elevation showing a combined isolator and shock absorbing unit also embodying the present chock devices.

Similar references characters designate corresponding parts throughout the several figures of the drawings.

The present device, designated generally as A preferably includes the abutment members B and C, the first member being adapted to be secured to the foundation or its equivalent D and the second member being adapted to be secured to the machinery base, or its equivalent E.

Figs. 1-5 show the devices A as they might be used in a machine installation wherein the machine M carried by the base E is supported on a plurality of spring isolators F intended to absorb disturbing frequencies generated by the machine M to prevent their transmission to the foundation D, or vice versa. Figs. 6 and 7 show the application of the chock device to the isolator units themselves.

Referring now more in detail to the structural features of the chock devices A, it will be observed that the relatively fixed abutment element B preferably includes a vertical wall 1 having a laterally offset fin or key portion 2 so that the upstanding part of the member B is of substantially T-shape in vertical cross section. The wall 1 may be held in a vertical position by any appropriate means, such, for example, as the horizontal attaching portion 3 and the triangular reinforcing plates 3a, the said member B being anchored to the foundation D through the medium of the bolts 4 or the like. At each side of the fin or key 2 the wall 1 is provided with suitable openings 5 for receiving the guide pins 6 of the compression plates 7. These compression plates may be moved or forced in one direction by the adjusting bolts 8 which are threaded into the vertical wall 1 substantially in the middle portion of the compression plate 7. As will be apparent from the drawings, these bolts may be adjusted as desired to move the compression plates 7 toward or from the wall 1 and may be set in a selected adjusted position by means of a lock nut 8a.

The member C, which is carried by the machinery base or its equivalent, preferably consists of a vertical part in the form of a wall 9 of channel-shaped cross section. When the member C is to be applied to a machinery base E, the channel 9 is preferably fitted with an offset attaching arm 10 so that the said part C may be conveniently attached to the machinery base E by bolts 11 or their equivalent. The channel 9 is provided in opposite corners thereof with the blocks 12 of isolation material such as cork, rubber, felt, or any other material of the type used for vibration isolation. These blocks are preferably spaced from each other centrally of the channel so as to embrace the opposite faces of the fin or key 2 of the member B. The exposed outer faces of the blocks 12 are also intended to be engaged by the compression plates 7. It will thus be apparent that the isolation blocks 12 are confined on two sides by the angular walls of the channel 9 while the other two sides are confined respectively by the fin or key 2 and a compression plate 7.

While the foregoing description describes the preferred construction and arrangement, it will of course be understood that the invention would be the same if the member B were formed with the channel while the member C was formed with the fin or key 2. In others words, the mere reversal of the construction described would not alter the function and operation of the device in use.

By reason of the construction set forth, the members B and C will permit of relative vertical movement by the machinery base and the foundation thereby to allow the spring isolators F to function in their normal manner. In other words, the members B and C are inter-engaged for vertical movement, but are so constructed as to resist horizontal movement, and when used in pairs opposing each other are intended to resist both transverse and longitudinal movement of the machine relative to the base in all directions. Moreover, since the fin or key 2 is engaged or embraced by the isolation blocks 12, it will be apparent that any tendency of the machinery base to rock or roll on a horizontal axis, that is, on an axis parallel to the foundation D will effectively resisted. The compression plates 7 are always set, for a given installation, to compress the blocks 12 of isolation material so that longitudinal movement of the bottom of the channel 9 toward the wall 1 is always resisted and likewise rocking, rolling, or transverse movement of the machinery base relative to the member B is resisted by the fin or key 2 fitting between the blocks 12.

Figs. 1 to 5 inclusive illustrate the application of the chock device to a machinery base and its foundation, but Figs. 6 and 7 illustrate the application of the invention to prefabricated isolation units. In Fig. 6 the isolator includes the top plate E2 and the bottom plate D2 which is secured to the foundation. The characteristics of the member B2 and the member C2 in Fig. 6 are the same as those of B and C respectively in Fig. 4. In Fig. 6, the chock devices A2 are used in conjunction with the isolator springs S which are the equivalent of the units F in Fig. 1.

Fig. 7 illustrates the use of chock devices A3 in conjunction with isolator springs S2 and a shock absorbing unit S3. The chock devices A3 comprise the foundation abutments B3 and the machinery base carried abutment C3 having the same structural features and characteristics of those described in connection with Figs. 3, 4 and 5. It will of course be understood that the spring isolators S2 are confined between the isolator top plate E3 and the base plate D3 which latter is secured to the foundation.

When the chock devices A2 and A3 are incorporated in opposed pairs in an isolation unit, they perform the same service and function as opposed pairs of chock units installed between a machinery base and a foundation where these two elements are separated by individual isolation units.

From the foregoing, it will be apparent that all forms of construction include a foundation carried part and a machinery base carried part which are inter-engaged or inter-fitted after the fashion of a mortise and tenon joint. That is to say, the two parts of the chock device are designed to permit relative vertical movement between the machinery base and its foundation and, when used in opposed pairs are capable of yielding resisting movement in all directions. The chock devices are intended to adjustably and yieldingly resist both longitudinal and transverse movement if the force is applied to the chock at an angle of 90° to the vertical, and will also resist shock manifesting itself from all directions of the compass as well as a rotational movement in any of the transverse or longitudinal directions.

I claim:

1. A chock device, for use in connection with machinery vibration isolators and the like, comprising a pair of members respectively associated with a foundation and machinery base, one of said members being of vertically disposed channel cross section and the other being of vertically disposed T-section with the shank of the T projecting into the channel, blocks of isolation material fitted in the corners of the said channel section and centrally spaced to embrace the sides of the shank of the said T-section, compression plates carried by the member of T-shaped cross section, and means for subjecting said blocks to pressure.

2. A chock device, for use in connection with machinery vibration isolators and the like to resist horizontal and rocking motion of the machine relative to its foundation, comprising, a relatively fixed member connected with the foundation and including a vertical portion of substantially T-shaped cross section, a relatively movable member associated with the machinery base and including a vertical portion of substantially channel-shaped cross section, a pair of blocks of isolation material arranged in the corners of the channel section and embracing the opposite faces of the shank of the T-shaped portion of the relatively fixed member, a pair of compression plates supported by the head of the portion of T-shaped cross section and on each side of the shank portion thereof, said compression plates engaging one face of the isolation blocks, and compression screws carried by the head of the said T-shaped cross section and adapted to force aforesaid compression plates against the isolation blocks.

3. In a mounting for machinery and the like, the combination with a machinery base and the foundation, of isolator means between the base and foundation for absorbing vibrations comprising, a pair of vertically disposed horizontally spaced isolation elements, a pair of oppositely facing vertically disposed mortise members, and a pair of vertically disposed tenon members cooperating with said mortise members and spaced isolation elements arranged therebetween providing for relative vertical movement of the isolator means, said mortise and tenon members being each relatively fixed to the machinery base and foundation to resist horizontal movement in all directions.

4. In a mounting for machinery, the combination with a machinery base and a foundation having isolating means therebetween providing for relative vertical motion between the base and foundation, chock means for permitting said relative vertical motion between the base and foundation and resisting forces manifested in a plane substantially parallel to the base or foundation, said chock means comprising, a pair of chock members respectively connected to the base and foundation, one of said members including a pair of vertically disposed vibration absorbing units each horizontally spaced from the other and each supported at their inner and adjacent side faces against lateral movement by horizontal forces manifested in planes substantially at right angles to the said supported faces, and the other of said members comprising vertically disposed abutment means having a portion entering the space between said units and engaging the sides thereof which face each other, said abutment means also including portions engaging the outer faces of the vibration absorbing units.

5. In a mounting for machinery, the combination with a machinery base and a fundation having isolating means therebetween providing for relative vertical motion between the base and foundation, chock means for permitting said relative vertical motion between the base and foundation and resisting forces manifested in a plane substantially parallel to the base or foundation, said chock means comprising, a pair of members respectively associated with the foundation and machinery base, one of said members being of vertically disposed channel cross section and the other being of vertically disposed T-section with the shank of the T projecting into the channel, blocks of isolation material fitted in the corners of said channel section and centrally spaced to embrace the sides of the shank of said T-section.

6. In a mounting for machinery, the combination with a machinery base and a foundation having isolating means therebetween providing for relative vertical motion between the base and foundation, chock means for permitting said relative vertical motion between the base and foundation and resisting forces manifested in a plane substantially parallel to the base or foundation, said chock means comprising, an upright abutment member adapted to be secured to the foundation, and another upright member adapted to be suspended from the machinery base, one of said members having vertically disposed inwardly facing angular portions at the outer sides thereof and the other having vertically disposed outwardly facing angular portions located medially thereof, and separate isolation elements each confined between a related pair of inwardly and outwardly facing angular portions of said members.

7. In a mounting for machinery, the combination with a machinery base and a foundation having isolating means therebetween providing for relative vertical motion between the base and foundation of chock means for permitting said relative vertical motion between the base and foundation and resisting forces manifested in a plane substantially parallel to the base or foundation, said chock means including chock members respectively connected to the base and foundation, one of said members comprising a vertically disposed channel member whose inner face and side flanges provide inwardly facing isolation seats, and the other of said members including angularly arranged wall elements having faces which also provide isolation seats arranged diagonally opposite the first-mentioned isolation seats, and isolation blocks confined in said seats.

SIEGFRIED ROSENZWEIG.